United States Patent [19]

Reddy et al.

[11] Patent Number: 5,112,524
[45] Date of Patent: May 12, 1992

[54] UNACTIVATED YTTRIUM TANTALATE PHOSPHOR

[75] Inventors: Vaddi B. Reddy, Sayre, Pa.; Ha K. Cheung, Baltimore, Md.

[73] Assignee: GTE Products Corporation, Stamford, Conn.

[21] Appl. No.: 732,886

[22] Filed: Jul. 19, 1991

[51] Int. Cl.$^5$ .............................................. C09K 11/78
[52] U.S. Cl. ............................................. 252/301.4 R
[58] Field of Search ................................. 252/301.4 R

[56] References Cited

U.S. PATENT DOCUMENTS 4,959,174  9/1990  Nakajima et al. ............ 252/301.4 R
4,970,024  11/1990  Reddy .......................... 252/301.4 R

FOREIGN PATENT DOCUMENTS 202875  11/1986  European Pat. Off. ..... 252/301.4 R

Primary Examiner—Jack Cooper
Attorney, Agent, or Firm—James Theodosopoulos

[57] ABSTRACT

An unactivated yttrium tantalate phosphor, M'YTaO$_4$, contains one or more additives of Sr, Rb and Al in order to improve brightness under X-radiation.

6 Claims, No Drawings

UNACTIVATED YTTRIUM TANTALATE PHOSPHOR

BACKGROUND OF THE INVENTION

This invention concerns yttrium tantalate phosphor. Examples of such a phosphor are disclosed in U.S. Pat. Nos. 4,225,653, 4,387,141, 4,970,024 and 5,009,807. However the phosphors disclosed therein are activated phosphors. That is to say, the wavelength at which the phosphors emit is primarily determined by the activating ion. For example, niobium activated yttrium tantalate emits at about 410 nanometers.

SUMMARY OF THE INVENTION

This invention concerns unactivated yttrium tantalate phosphor having M prime monoclinic structure, M'YTaO$_4$. Such a phosphor emits in the UV at about 340 nanometers. I have found that the brightness of the unactivated yttrium tantalate phosphor can be increased by the use of certain additives during the manufacture of the phosphor. Such additives are strontium, rubidium and aluminum. The amount of additive should be between about 0.001 to 0.1 moles per mole of yttrium tantalate.

PREFERRED EMBODIMENTS

EXAMPLE 1

As raw materials, 112.94 grams of Y$_2$O$_3$ and 220.94 grams of Ta$_2$O$_5$ were weighed into a jar and well mixed.

Then 166.95 grams of a flux was added to the mixture and mechanically mixed for 0.5 to 1.0 hours. The flux was a eutectic composition of (LiCl)$_2$—Li$_2$SO$_4$ in a mole ratio of 0.465 to 0.535. This second mixture was then loaded into crucibles and placed in an electric furnace. The furnace temperature was ramped up at a rate of 80°-90° C. per hour up to the firing temperature of about 1300° C. and fired at this temperature for about twelve hours. The furnace was then cooled to below 800° C. and the sample was taken out of the furnace and cooled to room temperature. The cake was then soaked in deionized water and the flux was washed off with further deionized water. The flux free powder was filtered, dried at 120° C. and classified.

A sample of this classified material was excited with tungsten or molybdenum x-radiation and the luminescence emission intensity of the phosphor was measured. This phosphor emitted in the uv-blue region of the spectrum with an emission maximum being around 340 nm. The luminescence intensity, hereafter called brightness, of this phosphor is taken as 100 percent as the control.

EXAMPLE 2

The procedure was exactly like in Example 1 except that 0.04 moles of strontium, in the form of either strontium carbonate, strontium oxide, or strontium halide, was added during the synthesis of phosphor. The brightness of the phosphor containing strontium was 104–105% compared to Example 1.

EXAMPLE 3

Same as Example 1 except that 0.002 moles of RbCl were added during the synthesis. The sample of this example had a brightness of 103% compared to the control in Example 1.

EXAMPLE 4

Same as Example 1 except that 0.02 moles of Al$_2$O$_3$ were added during the synthesis. The sample of this example had a brightness of 110% compared to the control.

EXAMPLE 5

Same as Example 1 except that 0.01 moles of SrCO$_3$ and 0.001 mole of RbCl were added during the synthesis. This phosphor had a brightness of 114% compared to the control.

EXAMPLE 6

Same as Example 1 except that 0.02 moles of SrCO$_3$ and 0.02 moles of Al$_2$O$_3$ were added during the synthesis. This sample was 113% in brightness compared to control.

EXAMPLE 7

Same as Example 1 except 0.002 moles of RbCl and 0.02 moles of Al$_2$O$_3$ were added during the synthesis. The phosphor obtained from this had a brightness of 109% compared to the control.

EXAMPLE 8

Same as Example 1 except that this sample was synthesized with 0.01 moles of Ga$_2$O$_3$. The brightness of this sample decreased to 83% compared to the control.

EXAMPLE 9

Same as Example 1 except that 0.01 moles of Ga$_2$O$_3$ and 0.04 moles of SrCO$_3$ were added during the synthesis. This sample had a brightness of 97% compared to the control.

EXAMPLE 10

Same as Example 1 except that 0.002 moles of RbCl and 0.01 moles of Ga$_2$O$_3$ were added during the synthesis. This sample had a brightness of 73-74% compared to the control.

EXAMPLE 11

Same as Example 10 except that 0.02 moles of Al$_2$O$_3$ were added in place of RbCl. The brightness of the phosphor was 86% compared to the control.

EXAMPLE 12

Same as Example 11 except that 0.002 moles of RbCl were added in addition to 0.02 moles of Al$_2$O$_3$ and 0.01 moles of Ga$_2$O$_3$. This sample had a brightness of 85% compared to control.

In similar examples, additives of 0.01 mole Sr yielded 104%, 0.04 mole Sr with 0.002 mole Rb yielded 104% and 0.04 mole Sr with 0.02 mole Al yielded 113%.

Thus it is seen that additives of rubidium, aluminum or strontium, or mixtures thereof, increased brightness to anywhere from 103 to 114% of the control, the unactivated yttrium tantalate without additives. It is also seen that an additive of gallium, either alone or with other additives, decreased brightness to anywhere from 73 to 97% of the control.

Preferably, the additive concentrations per mole of yttrium tantalate are as follows: for Al, 0.005–0.1 moles; for Sr, 0.001–0.1 moles; for Rb, 0.001–0.01 moles.

I claim:

1. An unactivated yttrium tantalate phosphor having M prime monoclinic structure and containing one or more additives of Rb and Al in an amount of between about 0.001 to 0.1 moles per mole of yttrium tantalate to improve brightness under X-radiation.

2. The phosphor of claim 1 which, under X-radiation, emits at a wavelength of about 340 nanometers.

3. The phosphor of claim 1 wherein the concentration of Al is between about 0.005 to 0.1 moles per mole of yttrium tantalate.

4. The phosphor of claim 1 wherein the concentration of Rb is between about 0.001 to 0.01 moles, per mole of yttrium tantalate.

5. An unactivated yttrium tantalate phosphor having M prime monoclinic structure and containing additives of Sr in an amount of between 0.001 to 0.1 moles per mole of yttrium tantalate and one or more of Rb and Al in an amount of between 0.001 to 0.1 moles per mole of yttrium tantalate the phosphor exhibiting a greater brightness under X-radiation than said phosphor absent Rb and Al.

6. The phosphor of claim 5 wherein when Al is one of the contained additives, the concentration of Al is between about 0.005 to 0.1 moles per mole of yttrium tantalate and when Rb is one of the contained additives the concentration of Rb is between about 0.001 to 0.01 moles per mole of yttrium tantalate.

* * * * *